(12) United States Patent
Davies

(10) Patent No.: US 6,343,769 B1
(45) Date of Patent: Feb. 5, 2002

(54) DEPLOYMENT INHIBITING ARRANGEMENT FOR A THRUST REVERSER SYSTEM

(75) Inventor: Stephen Harlow Davies, Telford (GB)

(73) Assignee: Lucas Industries plc (GB)

( * ) Notice: Subject to any disclaimer, the term of this patent is extended or adjusted under 35 U.S.C. 154(b) by 0 days.

(21) Appl. No.: 09/429,840

(22) Filed: Oct. 29, 1999

(30) Foreign Application Priority Data

Oct. 30, 1998 (GB) ............................................. 9823697

(51) Int. Cl.[7] ................................................ F02K 1/54
(52) U.S. Cl. .................. 244/110 B; 60/223; 239/265.11
(58) Field of Search ......................... 244/110 B, 129.1, 244/1 R; 239/265.11, 265.19, 265.33, 265.37; 60/230, 226.2, 390.91, 223

(56) References Cited

U.S. PATENT DOCUMENTS

| 4,586,329 | A | | 5/1986 | Carlin |
| 5,281,704 | A | | 1/1994 | Anderson et al. |
| 5,359,818 | A | | 11/1994 | Davies |
| 5,448,884 | A | * | 9/1995 | Repp ............................ 60/223 |
| 5,609,020 | A | | 3/1997 | Jackson et al. |
| 5,720,449 | A | * | 2/1998 | Labourne et al. ....... 244/110 B |
| 5,819,527 | A | * | 10/1998 | Fournier ................. 244/110 B |
| 6,094,908 | A | * | 8/2000 | Baudu et al. ........... 244/110 B |
| 6,138,449 | A | * | 10/2000 | Hudson ....................... 60/223 |

* cited by examiner

Primary Examiner—Galen L. Barefoot
(74) Attorney, Agent, or Firm—Andrus, Sceales, Starke & Sawall

(57) ABSTRACT

A deployment inhibiting arrangement for a jet engine thrust reverser system, the system including one or more actuators for operating a thrust reverser of the system and first locking means for the or each actuator normally serving to hold the system in a condition in which the thrust reverser is undeployed, the inhibiting arrangement including additional locking means normally held in an inactive condition, but operable by means independent of said one or more actuators and said first locking means to provide an additional mechanical lock serving to prevent deployment of the thrust reverser irrespective of the condition of the first locking means and/or actuator(s). The invention also relates to a jet engine thrust reverser system, the system including such a deployment inhibiting arrangement.

7 Claims, 2 Drawing Sheets

DEPLOYMENT INHIBITING ARRANGEMENT FOR A THRUST REVERSER SYSTEM

This invention relates to a deployment inhibiting arrangement for a thrust reverser system and to a thrust reverser system including such an arrangement.

During maintenance of an aircraft jet engine on the ground, it is important, for safety reasons, to ensure that the engine thrust reverser cannot be deployed inadvertently, in order to miminimise the risk of injury to personnel. In some conventional arrangements, an inhibit device operates to prevent the usual electro-hydraulic control system from signalling deployment of the thrust reverser. Such arrangements can pose practical problems of operation at ground level and also leave open the possibility of the signal inhibiting device being inadvertently overridden, leaving the system in a potentially hazardous actuable condition.

An object of the present invention is to provide an improved arrangement for inhibiting operation of an aircraft jet engine thrust reverser system, in which the aforesaid drawbacks are alleviated or avoided.

According to the invention, there is provided a deployment inhibiting arrangement for a jet engine thrust reverser system, the system including one or more actuators for operating a thrust reverser of the system and first locking means for the or each actuator normally serving to hold the system in a condition in which the thrust reverser is undeployed, the inhibiting arrangement including additional locking means normally held in an inactive condition, but operable by means independent of said one or more actuators and first locking means to provide an additional mechanical lock serving to prevent deployment of the thrust reverser irrespective of the condition of the first locking means and/or actuator(s).

Preferably, the additional locking means comprises a locking member operatively associated with said one or more actuators, or means associated with the latter, and one or more locking elements, each movable between locking and unlocking positions in which it is respectively in and out of locking engagement with the locking member, the or each locking element being normally held in its unlocking position by a retainer which is movable by a control device operable externally of the engine to a position in which it permits movement of the or each locking element to its locking position to prevent operation of the or each actuator.

In one convenient arrangement, a plurality of thrust reverser actuators are provided and interconnected, for synchronous operation, by a synchronising shaft, and the locking member is drivingly connected to the synchronising shaft and arranged for locking co-operation with said one or more locking elements to prevent rotation of said shaft and thereby prevent operation of the actuators.

Preferably, the retainer is spring-urged towards its operative position and is operatively associated with a cam element connected to tie control device, the cam element being engageable with the retainer by operation of the control device so as to move the retainer from its operative position to permit said locking element or elements to move into locking engagement with the locking member.

The invention further resides in a jet engine thrust reverser system including one or more actuators for operating a thrust reverser of the system and first locking means for the or each actuator normally serving to hold the system in a condition in which the thrust reverser is undeployed, and a deployment inhibiting arrangement including additional locking means normally held in an inactive condition, but operable by means independent of said one or more actuators and said first locking means to provide an additional mechanical lock serving to prevent deployment of the thrust reverser irrespective of the condition of the first locking means and/or actuator(s).

The invention still further resides in a jet engine trust reverser system including a plurality of actuators for operating a thrust reverser of the system and first locking means for the actuators normally serving to hold the system in a condition in which the thrust reverser is undeployed, a synchronising shaft which in use interconnects said actuators for synchronous operation, and a deployment inhibiting arrangement including additional locking means normally held in an inactive condition, but operable by means independent of said actuators and said first locking means to provide an additional mechanical lock serving to prevent rotation of said shaft and thereby prevent operation of the actuators and so prevent deployment of the thrust reverser irrespective of the condition of the first locking means and/or actuators.

The invention will now be described, by way of example, with reference to the accompanying drawings in which.

Figure 1:
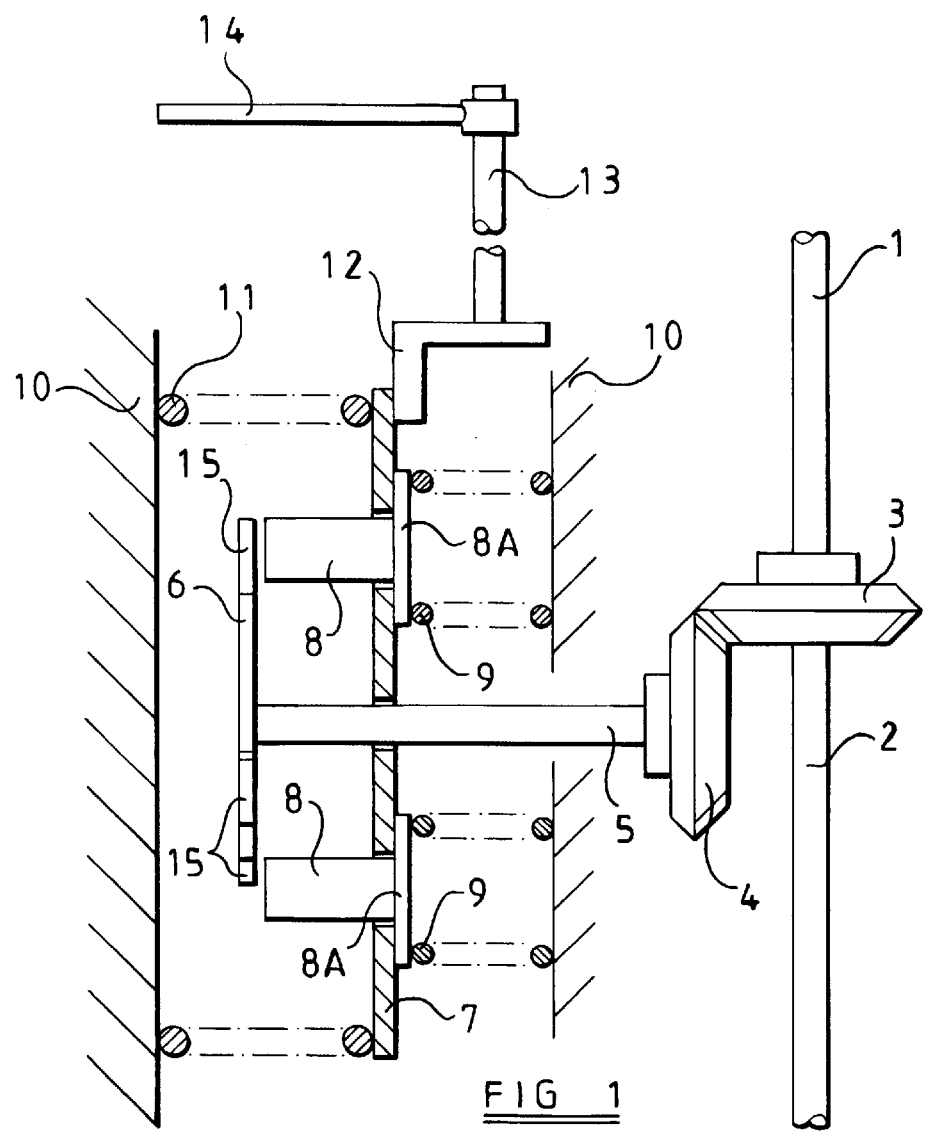
FIG. 1 is a diagrammatic representation of one form of the deployment inhibiting arrangement of the invention.
Figure 2:
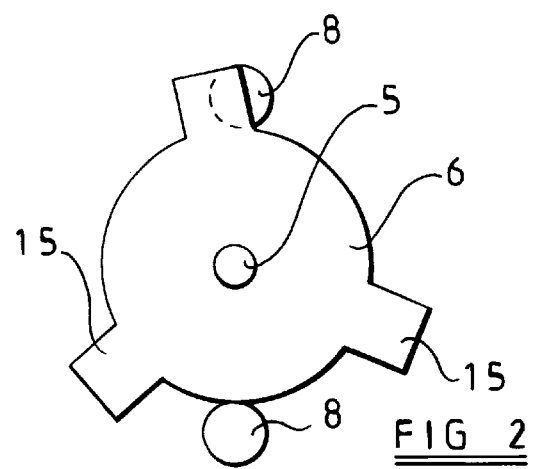
FIG. 2 is an end view of a component of the arrangement of FIG. 1.

The arrangement illustrated in FIGS. 1 and 2 is intended to be incorporated in an aircraft jet engine thrust reverser system having a plurality of actuators, conveniently in the form of hydraulic cylinders, for actuating a thrust reverser element, typically in the form of a translatable cowl. The actuators are operable to move the cowl between a normal position, in which exhaust gas flow is directed rearwardly of the engine, and a reverse thrust position, in which the exhaust flow is directed forwardly of the engine so as to provide a retarding force. The actuators are provided with hydro-mechanical locking devices intended to prevent unwanted deployment of the cowl by inadvertent operation of the actuators.

The invention is particularly concerned with the provision of a deployment inhibiting arrangement which, once actuated, prevents deployment of the cowl by the actuators, even if the latter are supplied inadvertently with high pressure.

In FIGS. 1 and 2, a synchronising shaft 1 interconnects the actuators in order to ensure synchronous operation thereof, in known manner and is coupled for rotation with a shaft 2 which, in turn, forms a driving connection with one of the actuators (not shown). The shaft 1 is connected via bevel gears 3, 4 to a shaft 5, which is fast for rotation with a locking plate 6. A retainer, in the form of a further plate 7 carries a pair of locking pins 8 which extend through the plate 7 and into close proximity with the locking plate 6, each pin 8 being urged to its illustrated position by a respective spring 9 acting between a head 8A of the pin and fixed structure 10. A further spring 11 acts between the fixed structure 10 and the side of the plate 7 opposite to that engaged by the heads 8A, to urge the plate 7 into engagement with a cam 12 fixed for rotation with a shaft 13, to which is secured an operating handle 14. The strength of the spring 11 is greater than the combined strengths of the opposed springs 9. As can be seen from FIG. 2, the locking plate 6 is generally circular and provided with three equi-spaced radially extending lobes 15 for locking co-operation with the pins 8, in the manner to be described. With the various components in their illustrated positions, the locking pins 8 are out of engagement with the plate 6, which is able to rotate freely when driving by the shafts 1, 2 via the gears 3, 4 during operation of the cowl actuators.

When it is required to service the engine on the ground, the inhibiting arrangement described can be operated to provide an additional mechanical lock against inadvertent actuation of the cowl by pressurisation of the actuators. The handle 14 would normally be located within the reach of an operative working on the engine and detented in its inoperative position. Rotation of the shaft 13 by operation of the handle 14 to a locking position, in which the handle is again detected, causes the cam 12 to exert a camming action on the plate 7 such as to move the latter, against the force of the spring 11, by a distance sufficient to permit at least one of the pins 8 to engage an edge surface of one of the lobes 15 in mechanical shear to prevent rotation of the shaft 5 and consequently of the synchronising shaft 1. Operation of the actuators is thereby prevented, so that even when the actuators are pressurised to full system pressure, there will be no possibility of the cowl moving to its deployed position. It will be seen that inhibition of cowl deployment by operation of the handle 14 may be carried out under the direct control of service personnel independently of the electro-hydraulic actuation control derived from the aircraft systems.

Figure 3:
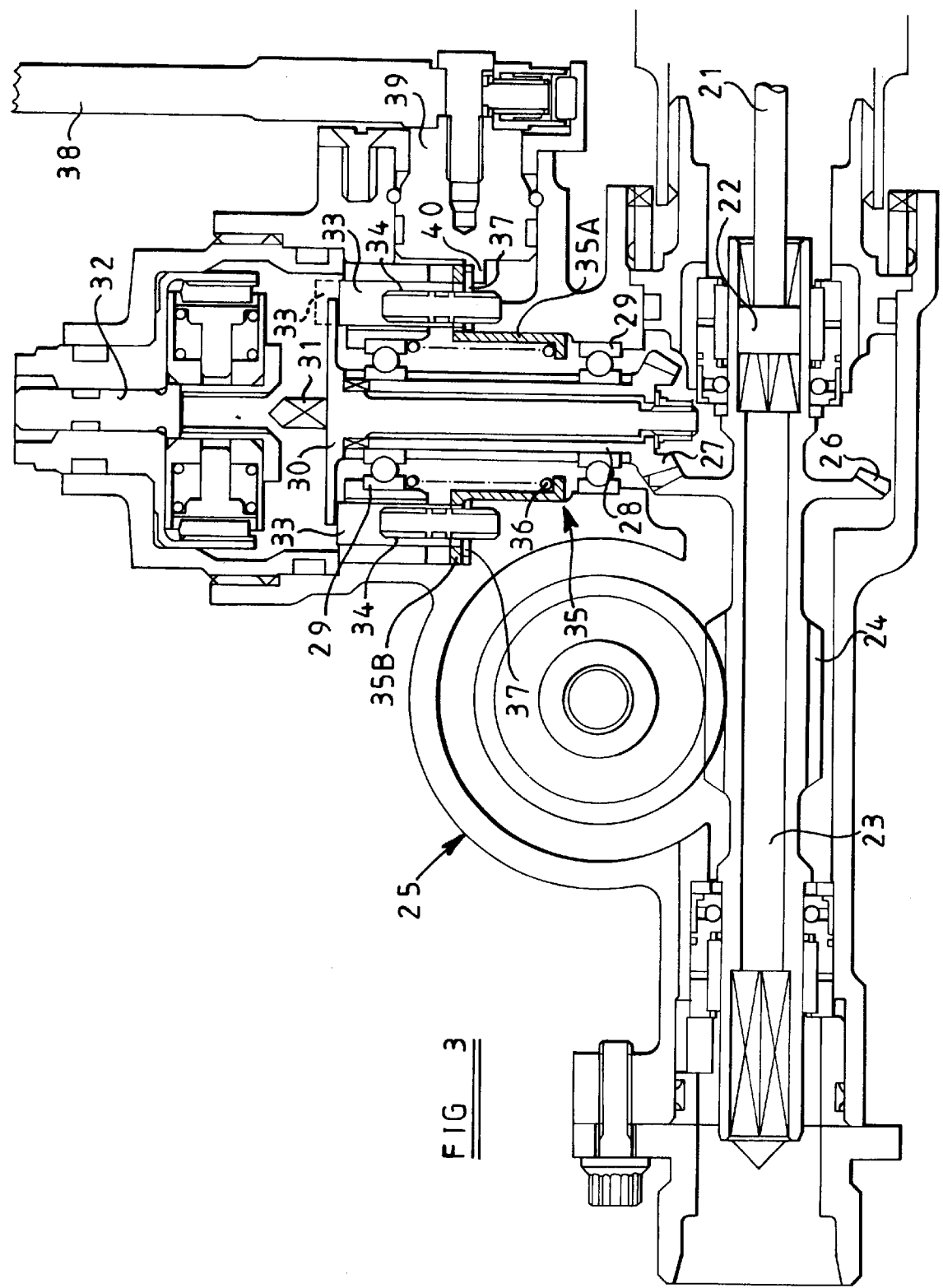
FIG. 3 is a side view, partly in cross-section, of one practical form of the deployment inhibiting arrangement of the invention.

In the practical arrangement of the invention illustrated in FIG. 3, the synchronising shaft 21 is drivingly connected, by a coupling 22 with a shaft 23 which forms at driving connection by way of teeth 24 with part of an actuator, indicated generally at 25, such that linear reciprocal movement of a driving component of the actuator, such as a piston, causes rotation of the shaft 23 and, via the synchronisation shaft 21 is synchronised with the movement of one or more similar actuators operating the thrust reverser cowl. A bevel gear 26 of the shaft 23 meshes with a similar gear 27 carried by a shaft 28 rotatably mounted in bearings 29. The inner end of the shaft 28 carries a locking plate 30 similar in form to that illustrated in FIG. 2 and, at its central region a formation 31 engageable by a conventional manual actuation mechanism 32.

A pair of locking pins 33 are urged by springs 34 towards positions of locking engagement with the plate 30, such a position being illustrated in broken lines for the right hand pin 33 as seen in the drawing. The pins are retained in their illustrated inoperative positions by a retainer, illustrated as a flanged sleeve in the form of an inverted top hat formation 35 of which a cylindrical part 35A surrounds the shaft 28, the sleeve being urged by a spring 36 into an operative position in which, by engagement of its flange 35B with heads 37 of the pins 33, holds the latter in their inoperative positions away from the retainer plate 30, against the action of the springs 34. A manual control handle 38 is secured to a rotary boss 39 carrying a cam formation 40 engaged with an adjacent surface of the retainer flange 35B.

When it is required to operate the deployment inhibiting arrangement of the invention, the shaft 38, which is held by a detent in its illustrated rest position, is actuated in a direction to cause the cam 40 to urge the retainer 35 upwardly as seen in the drawing, compressing the spring 36 and enabling the springs 34 to urge the pins 33 into locking engagement with the locking plate 30. The handle 38 is held in this operative position also by a detent. It will be seen that a secure mechanical lock is provided by at least one of the pins 33 engaging the locking plate 30 in shear, thereby ensuring that there is no possibility of the actuators being able to deploy the cowl, even under full system hydraulic pressure inadvertently applied. A maintenance operation can then be carried out on the engine in complete safety, normally through a service door provided in the cowl without risk of the cowl being deployed by accident and injuring maintenance personnel. After completion of the maintenance operation, the handle 38 is returned to its illustrated position, conveniently, automatically by the action of closing the cowl service door, enabling the spring 36 to return the retainer 35 to its operative position in which the springs 33 are withdrawn from the plate 30 and retained in their withdrawn positions against the action of the springs 34. The actuators are then able to operate normally in deployment and stowing of the cowl.

It will be understood that the system of the invention may take alternative forms. For example, the additional lock may act directly on the cowl itself rather than on the synchronisation shaft. The actuation means for the additional lock may be a power device, such as a solenoid, energisable from a power source independent of the first locking means and actuators.

I claim:

1. A deployment inhibiting arrangement for a jet engine thrust reverser system, the system including one or more actuators for operating a thrust reversed of the system and the first locking means for the or each actuator normally serving to hold the system in a condition in which the thrust reverser is undeployed, the inhibiting arrangement including additional locking means normally held in an inactive condition, but operable manually by means independent of said one or more actuators and said first locking means to provide an additional mechanical lock serving to prevent deployment of the thrust reverser irrespective of the condition of the first locking means and/or actuator(s).

2. A deployment inhibiting arrangement for a jet engine thrust reverser system, the system including one or more actuators for operating a thrust reverser of the system and first locking means for the or each actuator normally serving to hold the system in a condition in which the thrust reverser is undeployed, the inhibiting arrangement further including additional locking means comprising a locking member operatively associated with said one or more actuators, or means associated with said one or more actuators, and one or more locking elements movable between locking and unlocking positions respectively in and out of locking engagement with the locking member, the or each locking element being normally held in its unlocking position by a retainer which is movable by a control device operable externally of the engine and independently of said one or more actuators and said first locking means to a position in which it permits movement of the or each locking element to its locking position to prevent operation of the or each actuator to provide an additional mechanical lock serving to prevent deployment of the thrust reverser irrespective of the condition of the first locking means and/or actuator(s).

3. A deployment inhibiting arrangement as claimed in claim 2, wherein said locking members drivingly connected to a synchronising shaft which in use interconnects a plurality of thrust reverser actuators for synchronous operation, said locking member being arranged for locking co-operation with said one or more locking elements to prevent rotation of said shaft and thereby prevent operation of the actuators.

4. A deployment inhibiting arrangement as claimed in claim 2, wherein the retainer is spring-urged towards its operative position and is operatively associated with a cam element connected to the control device, the cam element being engageable with the retainer by operation of the control device so as to move the retainer from its operative position to permit said locking element or elements to move into locking engagement with the locking member.

5. A deployment inhibiting arrangement as claimed in claim 3, wherein the retainer is spring-urged towards its operative position and is operatively associated with a cam element connected to the control device, the cam element being engageable with the retainer by operation of the control device so as to move the retainer from its operative position to permit said locking element or elements to move into locking engagement with the locking member.

6. A jet engine thrust reverser system including one or more actuators for operating a thrust reverser of the system and first locking means for the or each actuator normally serving to hold the system in a condition in which the thrust reverser is undeployed, and a deployment inhibiting arrangement including additional locking means normally held in an inactive condition, but operable manually by means independent of said one or more actuators and said first locking means to provide an additional mechanical lock serving to prevent deployment of the thrust reverser irrespective of the condition of the first locking means and/or actuator(s).

7. A jet engine thrust reverser system including a plurality of actuators for operating a thrust reverser of the system and first locking means for the actuators normally serving to hold the system in a condition in which the thrust reverser is undeployed, a synchronising shaft which in use interconnects said actuators for synchronous operation, and a deployment inhibiting arrangement including additional locking means normally held in an inactive condition, but operable by means independent of said actuators and said first locking means to provide an additional mechanical lock serving to prevent rotation of said shaft and thereby prevent operation of the actuators and so prevent deployment of the thrust reverser irrespective of the condition of the first locking means and/or actuators.

\* \* \* \* \*